(12) United States Patent
Akaida et al.

(10) Patent No.: US 7,255,283 B2
(45) Date of Patent: Aug. 14, 2007

(54) READER-WRITER TERMINAL DEVICE FOR CONTACTLESS IC CARD, COMMUNICATION SYSTEM AND CONTACTLESS DATA CARRIER

(75) Inventors: Tetsuro Akaida, Fujisawa (JP); Tomoyuki Honma, Yokohama (JP); Seiki Kodama, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 267 days.

(21) Appl. No.: 11/042,107

(22) Filed: Jan. 26, 2005

(65) Prior Publication Data
US 2005/0161508 A1 Jul. 28, 2005

(30) Foreign Application Priority Data
Jan. 28, 2004 (JP) ............... 2004-020177
Dec. 10, 2004 (JP) ............... 2004-358832

(51) Int. Cl.
*G06K 19/06* (2006.01)
(52) U.S. Cl. ............ 235/492; 235/380; 235/451; 235/487
(58) Field of Classification Search ........... 235/492, 235/451, 486, 380, 487, 375; 340/10.1, 10.4
See application file for complete search history.

(56) References Cited
U.S. PATENT DOCUMENTS 5,175,418 A * 12/1992 Tanaka ............... 235/439
6,114,981 A * 9/2000 Nagata ............... 341/143
6,173,897 B1 * 1/2001 Halpern ............... 235/488
6,427,065 B1 * 7/2002 Suga et al. ............... 455/41.1
6,889,905 B2 * 5/2005 Shigemasa et al. ......... 235/492
6,955,300 B1 * 10/2005 Yoshigi et al. ............. 235/492
7,044,393 B2 * 5/2006 Watanabe et al. ........... 235/492
7,114,653 B2 * 10/2006 Yoshioka ................. 235/451
2004/0134985 A1 * 7/2004 Deguchi et al. ........... 235/451

FOREIGN PATENT DOCUMENTS

| JP | 11-46354 | 2/1999 |
|----|----------|--------|
| JP | 2000-151290 | 5/2000 |
| JP | 2003-36418 | 2/2003 |

\* cited by examiner

*Primary Examiner*—Thien M. Le
*Assistant Examiner*—Edwyn Labaze
(74) *Attorney, Agent, or Firm*—Oblon, Spivak, McClelland, Maier & Neustadt, P.C.

(57) ABSTRACT

A transmission circuit transmits a command to a contactless IC card. A receiving circuit receives a transmission signal from the IC card and an amplifying circuit in the receiving circuit amplifies the reception signal. An impedance element to which the reception signal is applied is provided at a preliminary stage of the amplifying circuit. The impedance element is controlled so that the impedance thereof is lowered, and an input signal to be input into the amplifying circuit is muted.

18 Claims, 7 Drawing Sheets

F I G. 1
PRIOR ART

FIG. 2A PRIOR ART  Antenna waveform

FIG. 2B PRIOR ART  Detection waveform

FIG. 2C PRIOR ART  Amplifying circuit input waveform

FIG. 2D PRIOR ART  Digitization circuit input waveform

FIG. 2E PRIOR ART  Digital output

READER-WRITER TERMINAL DEVICE FOR CONTACTLESS IC CARD, COMMUNICATION SYSTEM AND CONTACTLESS DATA CARRIER

CROSS-REFERENCE TO RELATED APPLICATIONS

This application is based upon and claims the benefit of priority from prior Japanese Patent Applications No. 2004-020177, filed Jan. 28, 2004; and No. 2004-358832, filed Dec. 10, 2004, the entire contents of both of which are incorporated herein by reference.

BACKGROUND OF THE INVENTION

1. Field of the Invention

The present invention relates to a reader-writer terminal device for a contactless IC card (smart card), a radio frequency identification (RFID) card or a contactless data carrier (hereinafter these are collectively referred to as a contactless IC card), a communication system including the reader-writer terminal device and the IC card, and a contactless data carrier incorporating the IC card and the reader-writer terminal device.

2. Description of the Related Art

In data communication using an IC card, a command response system in which one is a command transmitting side and the other is a response transmitting side in receiving a command is generally adopted. However, there is a case in which the receiving side and the transmitting side are not fixed at the initial point of time of the data communication, or there is a case in which the receiving side and the transmitting side replace each other in the middle of the data communication. Even in these cases, the transmitting side and the receiving side are fixed by dividing the data communication into short periods.

In data communication using an IC card, the time interval from the receipt of a command to the output of a response is usually defined by standard, individual specifications, etc. The time interval from the completion of the transmission of the command to the start of the receipt of the response is referred to as a waiting time. Data communication with a shorter waiting time can make the overhead time short and have an advantage in communication performance.

On the other hand, the IC card side in the contactless data carrier usually does not have a battery and a clock signal generating circuit. In this case, the reader-writer terminal side must maintain transmission of a carrier to supply power to the IC card side or reproduce a system clock signal.

Further, on the IC card side, a load modulation scheme is used as a response transmitting means. The switching system switches the load of the IC card on the IC card side, that is, varies carrier amplitude by increasing or reducing a load of an antenna on the reader-writer terminal side transmitting the carrier in accordance with variance of the impedance at an antenna end on the IC card side. According to such system, the response is received on the reader-writer terminal side by detecting the variation in carrier amplitude at the antenna end on the reader-writer terminal side.

A transmission circuit and a receiving circuit are mutually connected via the antenna on the reader-writer terminal side for transmitting a command to the IC card side and receiving the response. Thus, during the transmission of the command, a transmission signal from the transmission circuit creeps into the receiving circuit by itself. If the difference between the large amplitude of an input signal creeping into the receiving circuit during the transmission of the command and the small amplitude of a response receiving input signal is large, an amplification circuit in the receiving circuit is saturated by the large amplitude input during the transmission of the command. The receiving circuit cannot receive the response until the saturated state disappears.

Figure 1:
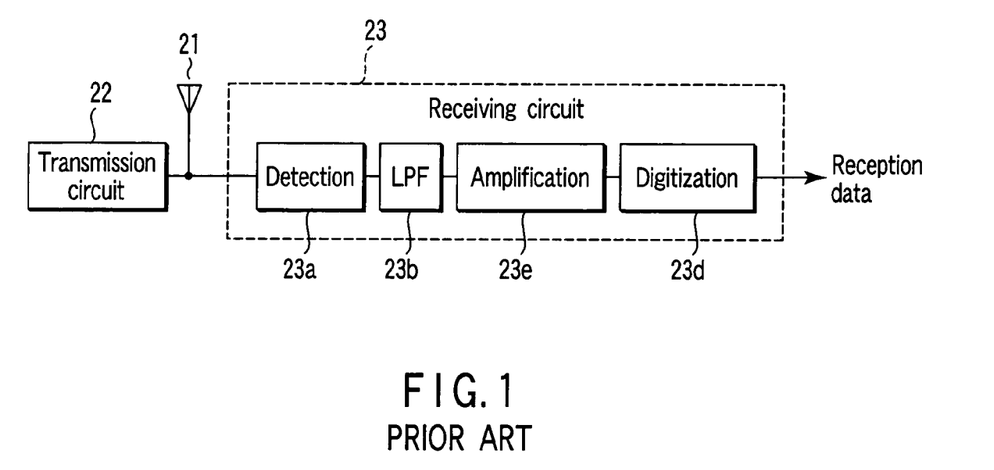
FIG. 1 is the block diagram showing the schematic structure of the transmission circuit and receiving circuit in the conventional reader-writer terminal device.

FIG. 1 is a block diagram showing a schematic structure of the transmission circuit and the receiving circuit in a conventional reader-writer terminal device. Both a transmission circuit 22 and a receiving circuit 23 are connected to an antenna 21. The receiving circuit 23 composed of a detecting circuit 23a, a low pass filter (LPF) circuit 23b, an amplifying circuit 23e and a digitization circuit 23d.

Figure 2A:
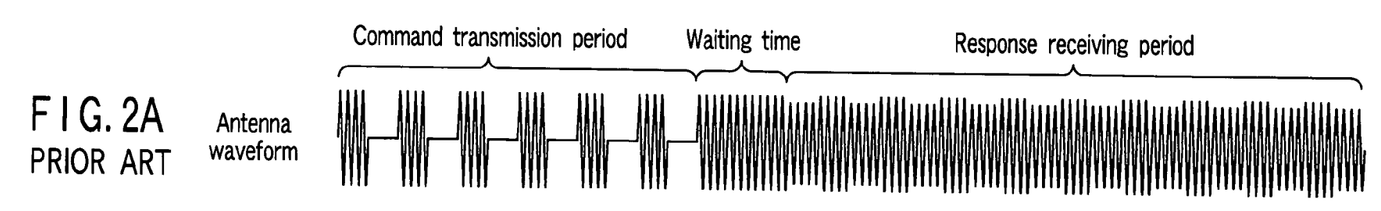
FIGS. 2A-2E are waveform charts showing examples of waveforms at the main portions in the conventional circuit in FIG. 1.
Figure 2B:
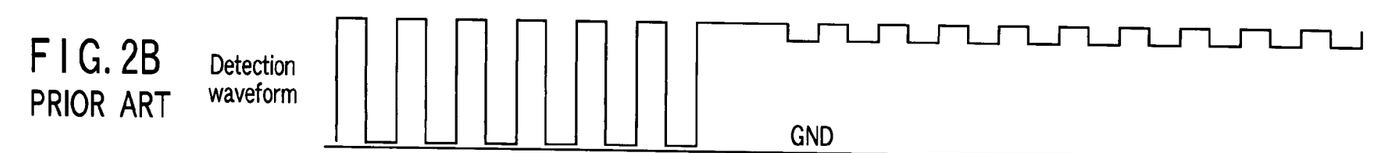
Figure 2C:
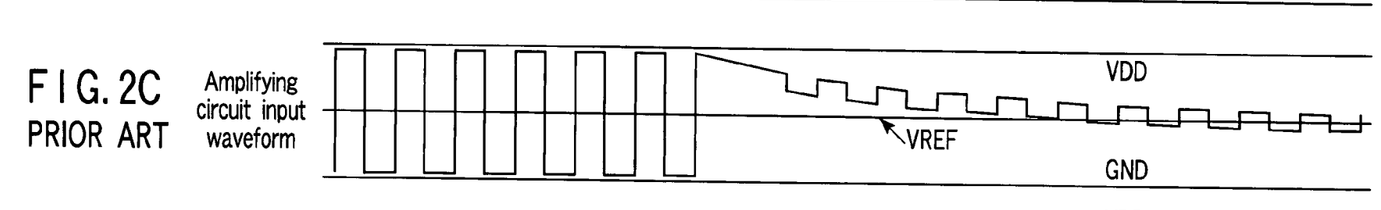
Figure 2D:
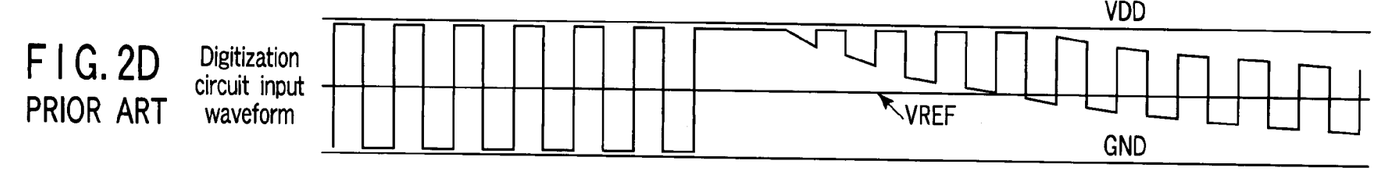

FIGS. 2A-2E illustrate examples of signal waveforms at main portions in FIG. 1, respectively. FIG. 2A illustrates an antenna waveform, FIG. 2B illustrates an output waveform (a detection waveform) of the detecting circuit 23a, FIG. 2C illustrates an input waveform of the amplifying circuit 23e, and FIG. 2D illustrates an output waveform of the digitization circuit 23d.

As shown in FIG. 2A, a carrier signal is modulated by the command (transmission data) at the transmission circuit 22 during a command transmission period and transmitted from the antenna 21. FIG. 2A illustrates an example in which the carrier signal is modulated with 100% modulation, when the data is transferred between the reader-writer terminal device and the IC card. The transmission of the response is started from the IC card after the lapse of the waiting time just after the transmission period.

Figure 2E:
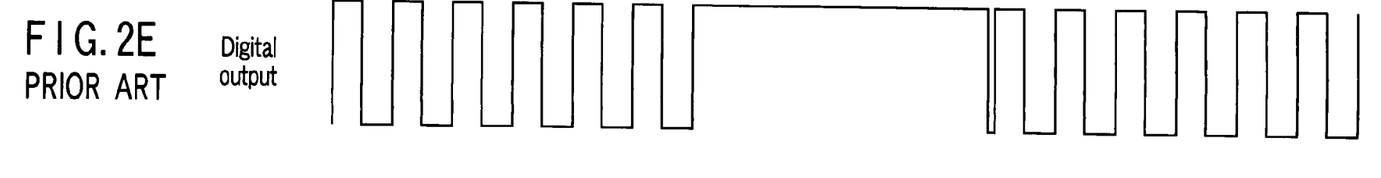

Since the large amplitude signal creeps into the receiving circuit 23 via the antenna 21 during the command transmission period, the detecting circuit 23a, LPF circuit 23b, amplifying circuit 23e and digitization circuit 23d operate respectively, digital data corresponding to the command is generated as shown in FIG. 2E. Since the large amplitude signal is input into the amplifying circuit 23e, it operates in a saturated state during the waiting period just after the command transmission period. As a result, the receiving circuit 23 enters a response receiving period, and when receiving the response from the IC card, the input waveform into the digitization circuit 23d hardly reaches a threshold voltage (VREF), then the response at an initial response in the response receiving period becomes impossible to be received. The period in which the response cannot be received becomes a bottleneck, it becomes impossible to shorten the waiting time then performance of the whole of the communication system is prevented from being improved.

Such problems can occur not only between the reader-writer terminal device and the IC card but also in the contactless data carrier equipped with both a reader-writer terminal part having the function of the reader-writer terminal device and a contactless IC card part having the function of the contactless IC card. As examples of the contactless data carrier, a cellular phone, a personal digital assistant (PDA), etc., incorporating the IC card part having a function of short-distance data communication, respectively, are cited.

In Jpn. Pat. Appln. KOKAI Publication No. 11-46354, a sound/image transmission device is described, wherein the transmission device multiplexes and transmits sound and an image, and separates them into the sound and the image to reproduce them on the receiving side, in which the operation of the receiving part is stopped during transmission of image blocks, and the transmission state is switched to the receiving state when the transmission of the image blocks is completed.

BRIEF SUMMARY OF THE INVENTION

According to a first aspect of the present invention, there is provided a reader-writer terminal device comprising: a transmission circuit configured to transmit a command to the IC card via an antenna; and a receiving circuit configured to receive a transmission signal from the IC card, the receiving circuit has an amplifying circuit to amplify a reception signal, lowers an impedance of an impedance element which is disposed in the amplifying circuit and to which the reception signal is applied and mutes an input signal into the amplifying circuit.

According to a second aspect of the present invention, there is provided a communication system, comprising: a contactless IC card configured to receive a command and transmits a response; and a reader-writer terminal device including a transmission circuit configured to transmit the command to the IC card via an antenna, and a receiving circuit configured to receive a transmission signal from the IC card, the receiving circuit has an amplifying circuit to amplify a reception signal, lowers an impedance of an impedance element which is disposed in the amplifying circuit and to which a reception signal is applied and mutes an input signal into the amplifying circuit.

According to a third aspect of the present invention, there is provided a contactless data carrier, comprising: a reader-writer terminal device including a transmission circuit configured to transmit a command via an antenna, and a receiving circuit configured to receive a reception signal received at the antenna, the receiving circuit has an amplifying circuit to amplify the reception signal, lowers an impedance of an impedance element which is disposed in the amplifying circuit and to which the reception signal is applied, and mutes an input signal into the amplifying circuit; and a contactless IC card which is connected to the antenna, receives the command via the antenna and transmits a response corresponding to the command from the antenna.

DETAILED DESCRIPTION OF THE INVENTION

Hereinafter, embodiments of the present invention will be explained by referring to the drawings.

Figure 3:
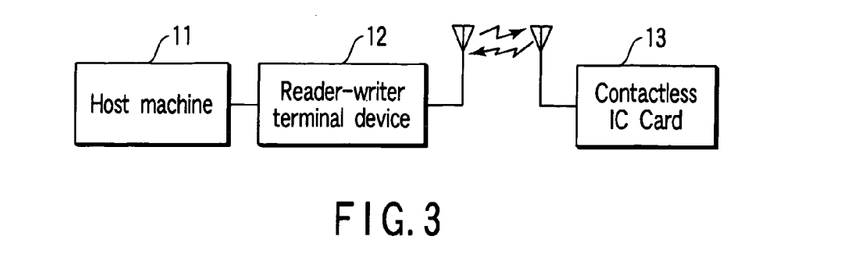
FIG. 3 is a block diagram showing the whole structure of the communication system regarding a first embodiment of the present invention.

FIG. 3 is the block diagram showing the whole structure of the communication system regarding the first embodiment of the present invention. A reader-writer terminal device 12 is connected to a host machine 11 composed of a personal computer (PC), etc. The terminal device 12 performs sending and receiving of data to and from the IC card 13. The sending and receiving of the data between the terminal device 12 and the IC card 13 is performed in a contactless state via the antenna with each other.

Figure 4:
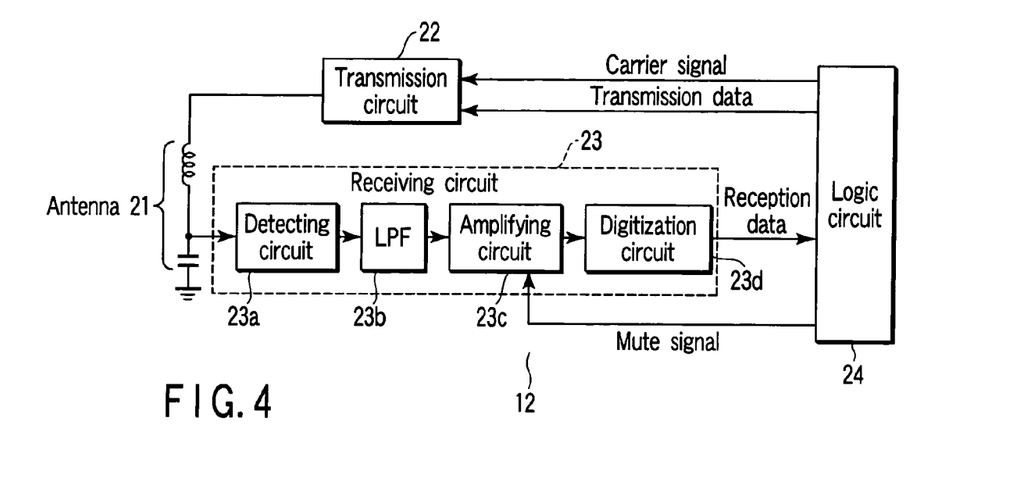
FIG. 4 is a block diagram showing a schematic structure of the reader-writer terminal device shown in FIG. 3.

FIG. 4 is the block diagram showing the schematic structure of the terminal device 12 shown in FIG. 3. The terminal device 12 includes the antenna 21, the transmission circuit 22, the receiving circuit 23 and a logic circuit 24. The logic circuit 24 supplies a carrier signal and transmission data to the transmission circuit 22, the transmission circuit 22 modulates the carrier signal by the transmission signal and sends it to the antenna 21. The receiving circuit 23 processes the signal received at the antenna 21 to generate reception data and supplies it to the logic circuit 24. The receiving circuit 23 includes the detecting circuit 23a to detect the signal received at the antenna 21, the LPF circuit 23b to which the output from the detecting circuit 23a is supplied, the amplifying circuit 23c to which the output from the LPF circuit 23b is supplied and the digitization circuit 23d to digitize the output from the amplifying circuit 23c and generate reception data. The operation of the amplifying circuit 23c is controlled by a mute signal output from the logic circuit 24.

Figure 5:
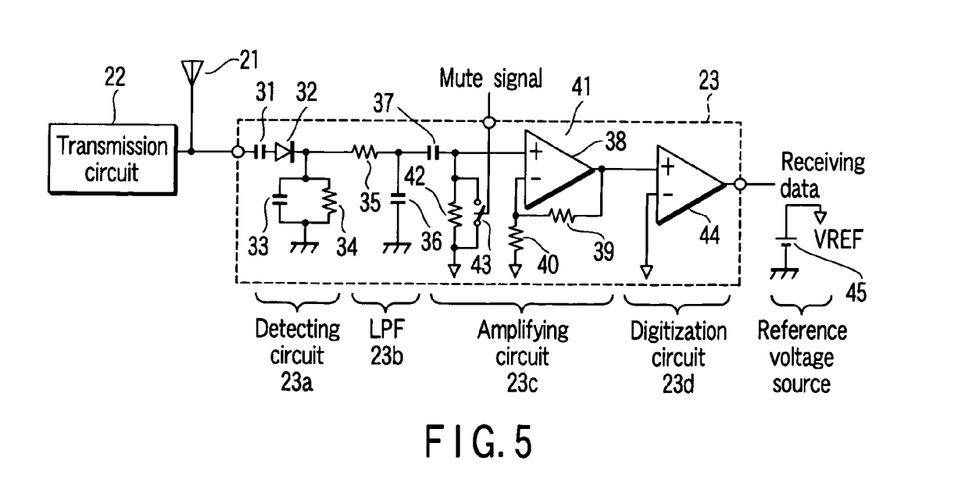
FIG. 5 is a circuit diagram showing an example of a detailed structure of the receiving circuit shown in FIG. 3.

FIG. 5 illustrates an example of a detailed circuit structure of the receiving circuit 23 shown in FIG. 4. FIG. 5 illustrates the antenna 21 and the transmission circuit 22 as well as the receiving circuit 23.

The detecting circuit 23a includes a capacitor 31 for DC shutoff, a detecting diode 32, and a capacitor 33 and a resistor 34 connected in parallel with each other. The LPF circuit 23b is composed of a resistor 35 and a capacitor 36. The amplifying circuit 23c is composed of a capacitor 37 for DC shutoff, an amplifier 41 consisting of an operational amplifier 38, a feedback resistor 39 connected between an output node and an inversion output node (−) of the operational amplifier 38, and a resistor 40 connected between the inversion input node (−) of the operational amplifier 38 and a reference voltage VREF node, a resistor 42 to be an impedance element connected between an non-inversion input node (+) of the amplifier 41 and the reference voltage VREF node and a switch element 43 connected in parallel with the resistor 42 and applied conduction control by the mute signal output from the logic circuit 24.

As the switch element 43, for example, a MOS transistor, in which a source-drain path is connected in parallel with the resistor 42 and the mute signal is applied to a gate electrode, may be used.

The digitization circuit 23d is composed of a voltage comparator 44 to compare the output from the amplifier circuit 23c with the reference voltage VREF. The value of the reference voltage VREF supplied to the amplifying circuit 23c and the digitization circuit 23d is, for example, an almost intermediate between a power supply voltage VDD supplied to the receiving circuit 23 and the ground voltage GND. A reference voltage source 45 to generate the reference voltage VREF may be disposed inside or outside the receiving circuit 23. A time constant of the LPF circuit 23b is set to the same value as that of a conventional circuit.

Figures 6A, 6B:
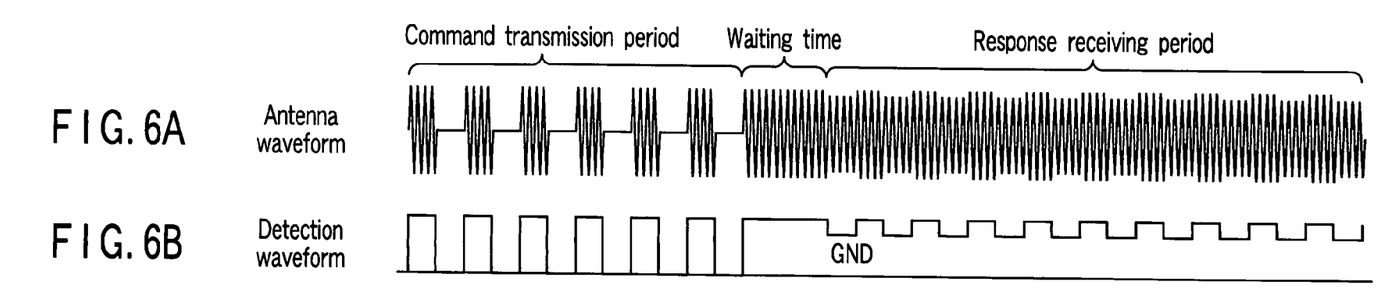
FIGS. 6A-6F are waveform charts showing the main portions of the reader-writer terminal device shown in FIG. 3.
Figure 6C:
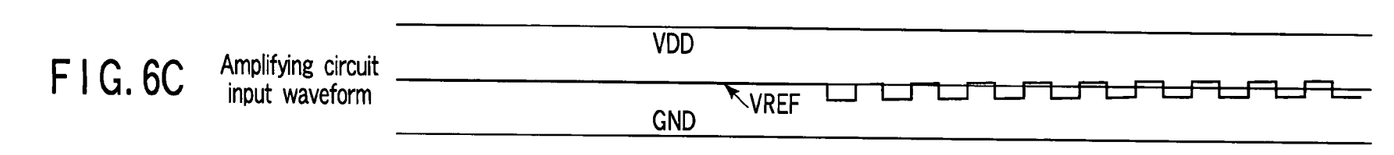
Figure 6D:
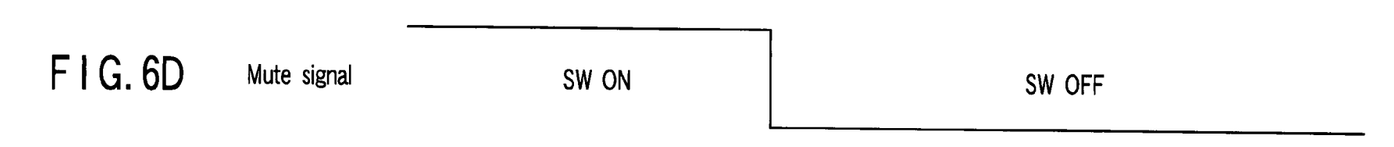
Figure 6E:
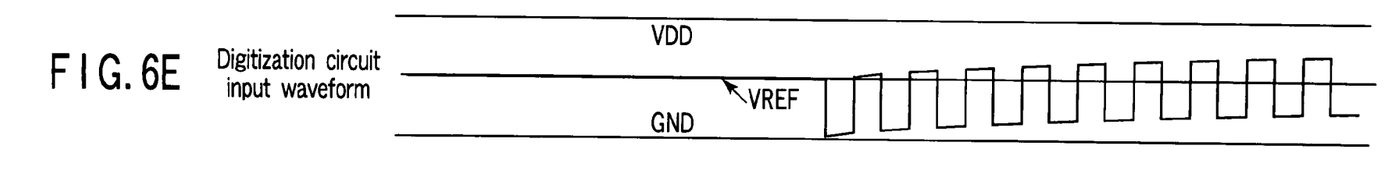
Figure 6F:
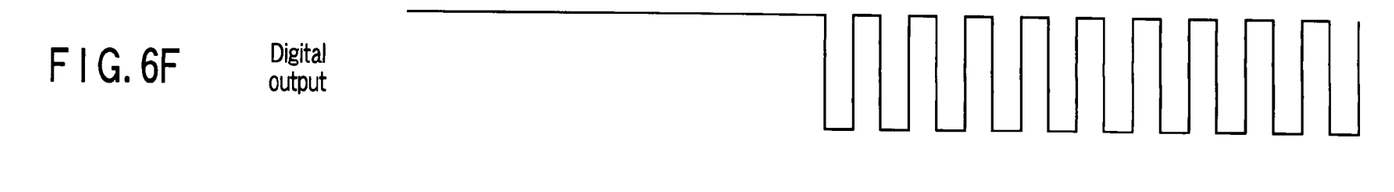
Figure 7A:
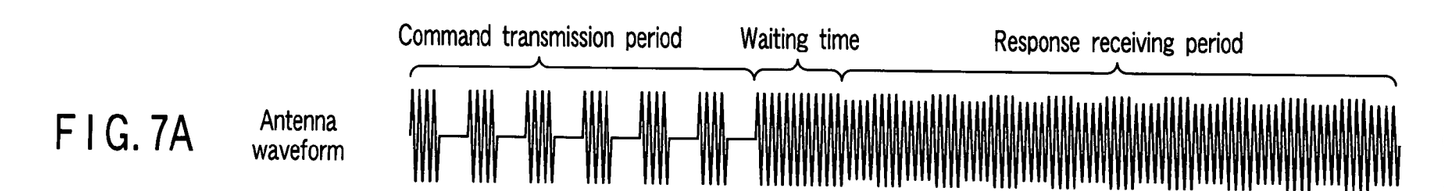
FIGS. 7A-7D are waveform charts showing the main portions of the reader-writer terminal device according to a modification of the first embodiment.
Figure 7B:
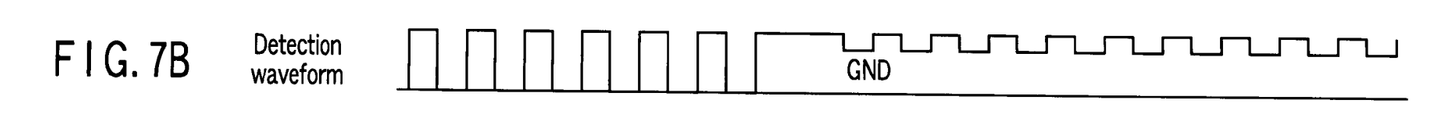
Figure 7C:
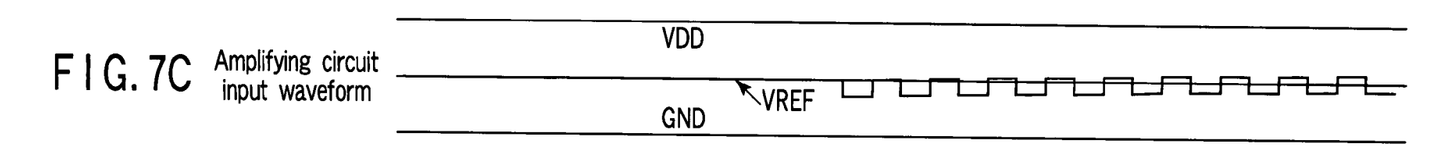
Figure 7D:
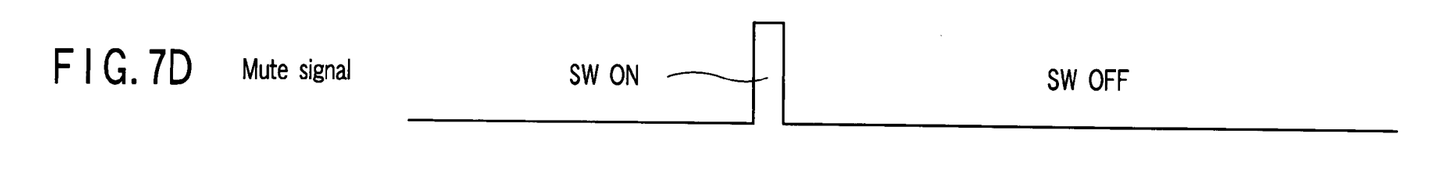

Next, an operation of the terminal device 12 composed as the above described structure will be explained by referring to the waveforms shown in FIGS. 6A-6F. FIGS. 6A-6F illustrate examples of main portions in a circuit shown in FIG. 5, respectively. FIG. 6A illustrates an antenna waveform, FIG. 6B illustrates an output waveform (a detection waveform), FIG. 6C illustrates an input waveform into the amplifying circuit 23c, FIG. 6D illustrates a waveform of the mute signal, FIG. 6E illustrates an input waveform into the digitization circuit 23d and FIG. 6F illustrates an output waveform (reception data) from the digitization circuit 23d.

As shown in FIG. 6A, the transmission circuit 22 modulates the carrier signal by the command (the transmission data) during the command transmission period, and the antenna 21 sends the carrier signal. FIG. 6A illustrates the case in which the carrier signal is modulated with 100% modulation, when the data sending and receiving is performed to and from the terminal device 12 and the IC card 13.

The switch element 43 in the amplifying circuit 23c is continuously brought into a conductive state (SW ON) by the mute signal output from the logic circuit 24. Accordingly, both ends of the resistor 42 in the amplifying circuit 23c are short-circuited by the switch element 43, and the impedance of the resistor 42 as the impedance element is lowered. As a result, the amplitude of the input signal supplied to the amplifying circuit 23c is reduced to be sufficiently small. That is, the input signal into the amplifying circuit 23c is muted during the command transmission period, the amplifying circuit is not saturated, and its output is set to the level of the reference voltage VREF.

When the command transmission period is over and entering into the waiting time, the switch element 43 in the amplifying circuit 23c is brought into a non-conductive state (SW OFF). After the lapse of the waiting time, the transmission of the response from the IC card 13 is started. If the IC card 13 is a batteryless contactless IC card having no built-in battery, the power supply, the system clock signal and the reception data are extracted from the reception signal received via the antenna 21. The reception data (the command) is appropriately processed by a control circuit including a CPU etc., then the response is generated. The generated response is transmitted to the side of the terminal device 12 by the load modulation scheme. As explained above, the load modulation scheme is a method to express the data by switching a load state to the antenna 21.

Here, the large amplitude signal creeps into the receiving circuit 23 via the antenna 21 during the command transmission period. However, the switch element 43 in the amplifying circuit 23c is brought into the conductive state by the mute signal, the large amplitude signal is not supplied into the amplifying circuit 23c and it is not saturated. After the lapse of the standby time, since the muted state of the input signal into the amplifying circuit 23c is released, it can amplify the input signal at a moment of a starting time of a response receiving period, and the digitization circuit 23d generates the digital data corresponding to the reception signal.

Conventionally, if the waiting time of the reader-writer terminal device for the IC card is short, when a response is transmitted from the side of the IC card, initial data can not be received and communication quality is degraded. In contrast, in the terminal device 12 and the communication system in the embodiment, even the waiting time of the terminal device 12 is shortened, the response can be received at an initial time of the response receiving period, thereby, the communication quality and the performance of the whole of the communication and the system can be improved.

In the above described embodiment, the case in which the switch element 43 in the amplifying circuit 23c is continuously brought into the conductive state (SW ON) during the command transmission period is explained. However, as shown in the waveforms of FIGS. 7A-7D, the same effect can be obtained even if the timing of the mute signal is changed so as to the switch element 43 is temporarily made conductive (SW ON) during the period before receiving the response from the IC card 13.

Figure 8:
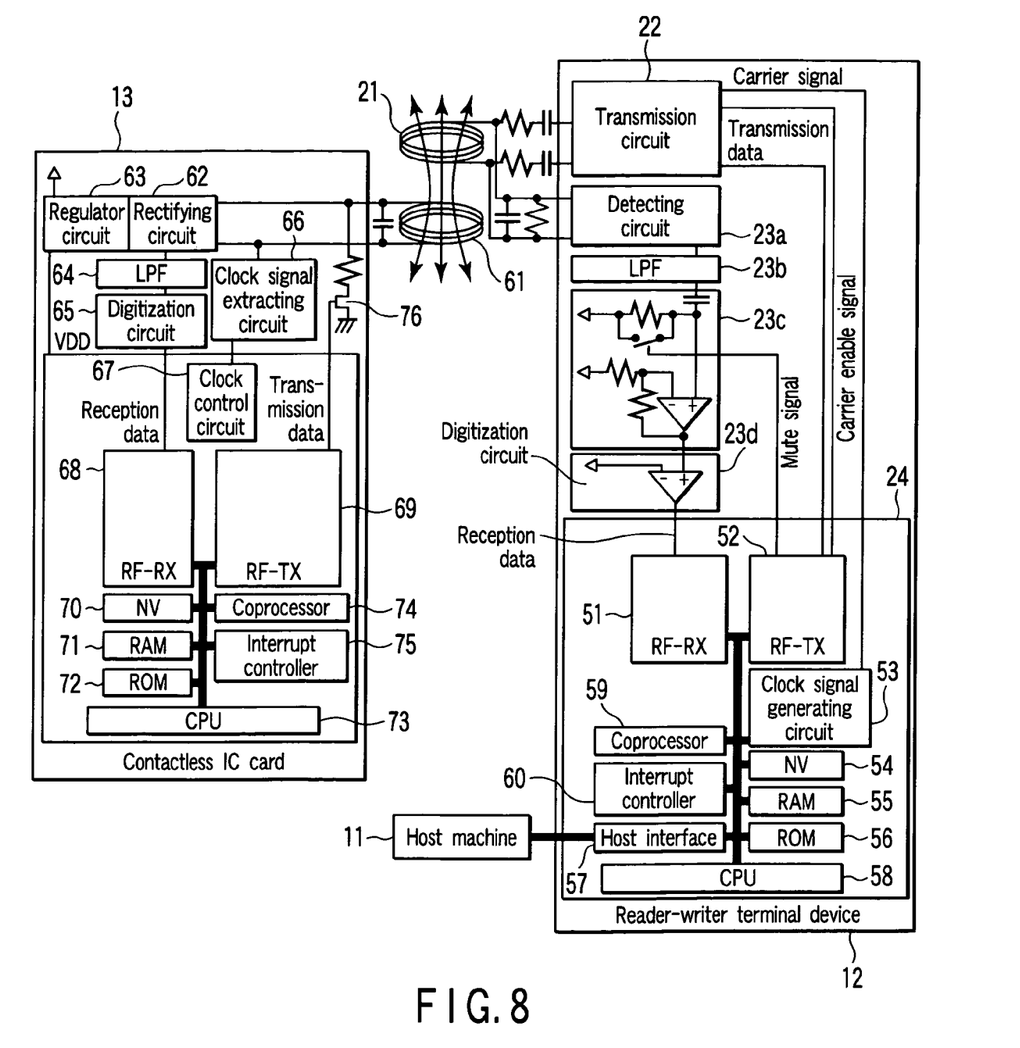
FIG. 8 is a block diagram in which each inner structure of the reader-writer terminal device and the contactless IC card shown in FIG. 3 appear in concrete forms, respectively.

FIG. 8 is the block diagram in which each inner structure of the terminal device 12 and the IC card 13 shown in FIG. 3 is appeared in concrete forms, respectively. The logic circuit 24 in the terminal device 12 includes a receiving processing (RF-RX) circuit 51, a transmission processing (RF-TX) circuit 52, a clock signal generating circuit 53, a nonvolatile memory (NV) circuit 54, A RAM circuit 55, a read only memory (ROM) circuit 56, a host interface (a host IF) 57, a central processing unit (CPU) 58, a coprocessor 59, an interrupt controller 60, etc.

The RF-RX circuit 51 receives reception data received by the receiving circuit 23 composed of the detecting circuit 23a, the LPF circuit 23b, the amplifying circuit 23c and the digitization circuit 23d, and performs synchronous processing, composite processing, serial/parallel conversion, etc. The RF-TX circuit 52 generates the command, etc., and performs the serial/parallel conversion, coding processing and the synchronous processing, so that transmission data and a carrier enable signal is generated and supplied to the transmission circuit 22. The clock signal generating circuit 53 generates a system clock signal and also a carrier signal and supplies them to the transmission circuit 22.

Data necessary for execution of above mentioned various processing is stored into the NV circuit 54, the RAM circuit 55 and the ROM circuit 56. The host IF 57 transfers the data to and from the host machine 11. The CPU 58 controls the operation of the whole of the terminal device 12. The coprocessor 59 performs, for example, encryption/decryption processing. The interrupt controller 60 is used for performing interrupt processing against the CPU 58.

The IC card 13 includes an antenna 61, a rectifying circuit 62, a regulator circuit 63, a LPF circuit 64, a digitization circuit 65, a clock signal extracting circuit 66, a clock control circuit 67, an RF-RX circuit 68, an RF-TX circuit 69, an NV circuit 70, an RAM circuit 71, a ROM circuit 72, a CPU 73, a coprocessor 74, an interrupt controller 75, a transistor 76 for load switching, etc.

The IC card 13 receives the command from the terminal device 12 and transmits the response. A rectifying circuit 62 and a regulator circuit 63 in the IC card 13 rectifies and stabilizes the carrier received at an antenna 61 and generates the power supply used in the IC card 13. The LPF circuit 64 and the digitization circuit 65 generate the reception data from the reception signal received at the antenna 61. The reception data is supplied to the RF-RX circuit 68.

The clock signal extracting circuit 66 and the clock control circuit 67 extract a clock signal from the carrier received at the antenna 61 and generate the system clock signal used in the IC card 13.

The RF-TX circuit 69 generates the transmission data, the data transmission is performed because the transistor 76 of which the one end of a source-drain path is connected to the antenna 61 via a resistor is brought into switching-control.

Functions of the NV circuit 70, the RAM circuit 71, the ROM circuit 72, the CPU 73, the coprocessor 74, the interrupt controller 75 in the IC CARD 13 are the same as that for corresponding in the terminal device 12, respectively.

Figure 9:
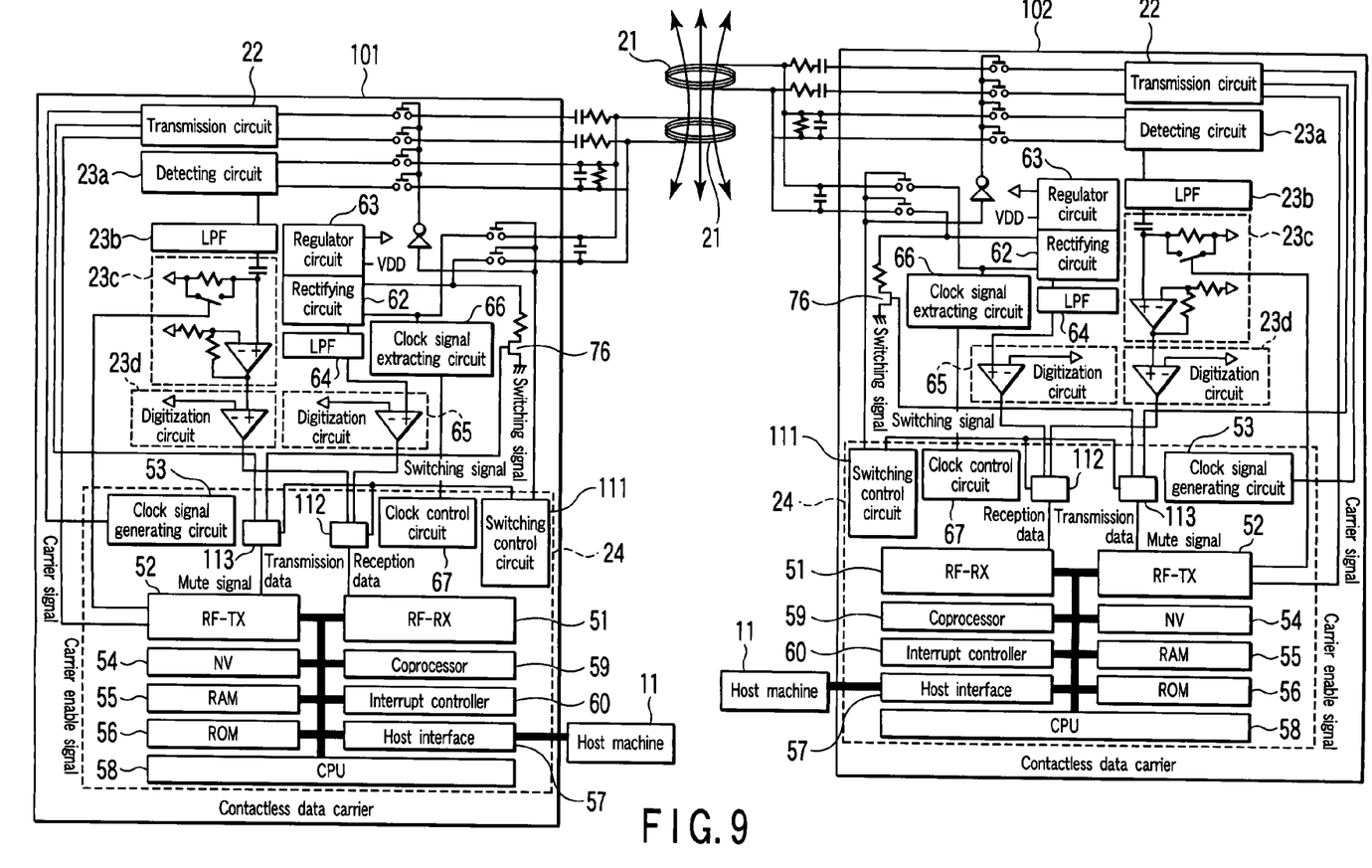
FIG. 9 is a block diagram showing a structure of a contactless data carrier IC card regarding a second embodiment of the present invention.

FIG. 9 is the block diagram showing the structure of the contactless data carrier regarding the second embodiment of the present invention. Two contactless data carriers 101, 102 performing data communication each other are illustrated therein. When the data carrier 101 functions as a contactless IC card, the data carrier 102 functions as a reader-writer device to supply the carrier signal and the clock signal and performs the data communication. In contract, when the data carrier 102 functions as the contactless IC card, the data carrier 101 functions as the reader-writer terminal and performs the data communication.

As stated above, as for each data carrier 101 and 102, for example, those incorporated in a cellular phone or PDA, etc., are cited. As mentioned above, the data carrier 101 and 102 are provided with the reader-writer terminal parts having the functions of the reader-writer terminal devices and the contactless IC card parts having the functions of the contactless IC card, respectively.

Fundamentally, each of the data carriers 101 and 102 has the same circuit structure as that of the terminal devices 12 and the IC card 13 shown in FIG. 8 respectively. Accordingly, parts corresponding to those in FIG. 8 are denoted by the same reference marks used in FIG. 8, and explanation of them is omitted. However, of the circuits overlapping between the terminal device 12 and the IC card 13, only one of the respective parts, for example, the receiving processing circuits, the transmission processing circuits, the NV circuits, the RAM circuits, the ROM circuits, the CPUs, the coprocessors, the interrupt controllers, etc., are disposed, respectively. For those overlapping circuits, the reference marks used in the terminal device 12 are denoted, respectively.

In the data carriers 101 and 102, since the RF-RX circuit 51 and the RF-TX circuit 52 are shared in the reader-writer terminal part and the contactless IC card part, respectively, switching control circuit 111 and two switching circuits 112 and 113 are added newly, respectively. The switching control circuit 111 generates switching signals in response to each application.

In one switching circuit 112, the reception data generated at the digitization circuit 23d in the reader-writer terminal part and the digitization circuit 65 in the contactless IC card part is switched in response to the switching signals, respectively, and supplied to the transmission circuit 22. On the other switching circuit 113, the transmission data generated at the RF-TX circuit 52 is switched in response to the switching signal and supplied to the transmission circuit 22 or the transistor 76 for the load switching.

In the amplifying circuit 23c in the receiving circuit 23 of the reader-writer terminal part, the switching element 43 is brought into the conductive sate in response to the mute signal, continuously during the command transmission period as shown in FIGS. 6A-6F, or temporarily during the period before receiving the response from other contactless data carrier as shown in FIGS. 7A-7D. As a result, the input signal into the amplifying circuit 23c is muted, the amplifying circuit 23c is not saturated, and its output is set to the level of the reference voltage VREF.

During the command transmission period, the large amplitude signal creeps into the receiving circuit 23 of the reader-writer terminal part via the antenna 21. However, the switching element 43 in the amplifying circuit 23c is brought into the conductive state by the mute signal, the large amplitude signal is not supplied to the amplifying circuit 23c, and the amplifier 41 therein is not saturated. After the lapse of the waiting time, since the muted state, in which the input signal into the amplifying circuit 23c is muted, is released, the amplifying circuit 23c can amplifies the input signal at the moment of the starting time of the response receiving period, and the digitization circuit 23d generates the digital data corresponding to the reception signal.

That is, in the contactless data carrier in the embodiment of the present invention, even if the waiting time of the reader-writer terminal part is shorten, the response can be received from the initial stage of the response receiving period, therefore, the communication quality and the performance of the communication and the whole of the system can be improved.

The structure of the contactless data carrier is not limited to that shown in drawings, in fact, it is enough for the structure thereof to have both functions of the reader-writer terminal part and the contactless IC card part.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A reader-writer terminal device for a contactless IC card, comprising:
    a transmission circuit configured to transmit a command to the IC card via an antenna; and
    a receiving circuit configured to receive a transmission signal from the IC card, the receiving circuit has an amplifying circuit to amplify a reception signal, lowers an impedance of an impedance element which is disposed in the amplifying circuit and to which the reception signal is applied, and mutes an input signal into the amplifying circuit during a command transmission period in which the transmission circuit transmits the command.

2. The device according to claim 1, wherein the receiving circuit includes a switching element connected in parallel with the impedance element and controlled in response to a control signal.

3. The device according to claim 2, wherein the switching element is composed of a MOS transistor in which a source-drain path is connected in parallel with the impedance element, and a mute signal is supplied to a gate electrode.

4. The device according to claim 2, wherein the switching element is controlled by the control signal to be continuously brought into an ON state during a command transmission period.

5. The device according to claim 2, wherein the switching element is controlled by the control signal to be temporarily brought into an ON state during a period before receiving a response corresponding to the command.

6. The device according to claim 1, wherein the receiving circuit further comprising:
- a detecting circuit configured to detect the reception signal received at the antenna;
- a low pass filter circuit connected to the detecting circuit to supply its output to the amplifying circuit; and
- a digitization circuit which is connected to the amplifying circuit and digitizes an output from the amplifying circuit to generate reception data.

7. A communication system, comprising:
- a contactless IC card configured to receive a command and transmits a response; and
- a reader-writer terminal device including a transmission circuit configured to transmit the command to the IC card via an antenna, and a receiving circuit configured to receive a transmission signal from the IC card, the receiving circuit has an amplifying circuit to amplify a reception signal, lowers an impedance of an impedance element which is disposed in the amplifying circuit and to which a reception signal is applied, and mutes an input signal into the amplifying circuit during a command transmission period in which the transmission circuit transmits the command.

8. The system according to claim 7, wherein the receiving circuit includes a switching element connected in parallel with the impedance element and controlled in response to a control signal.

9. The system according to claim 8, wherein the switching element is composed of a MOS transistor in which a source-drain path is connected in parallel with the impedance element, and a mute signal is supplied to a gate electrode.

10. The system according to claim 8, wherein the switching element is controlled by the control signal to be continuously brought into an ON state during a command transmission period.

11. The system according to claim 8, wherein the switching element is controlled by the control signal to be temporarily brought into an ON state during a period before receiving the response corresponding to the command.

12. The system according to claim 7, wherein the receiving circuit further comprising:
- a detecting circuit configured to detect the reception signal received at the antenna;
- a low pass filter circuit connected to the detecting circuit to supply its output to the amplifying circuit; and
- a digitization circuit which is connected to the amplifying circuit and digitizes an output from the amplifying circuit to generate reception data.

13. A contactless data carrier, comprising:
- a reader-writer terminal device including a transmission circuit configured to transmit a command via an antenna, and a receiving circuit configured to receive a reception signal received at the antenna, the receiving circuit has an amplifying circuit to amplify the reception signal, lowers an impedance of an impedance element which is disposed in the amplifying circuit and to which the reception signal is applied, and mutes an input signal into the amplifying circuit during a command transmission period in which the transmission circuit transmits the command; and
- a contactless IC card which is connected to the antenna, receives the command via the antenna and transmits a response corresponding to the command from the antenna.

14. The data carrier according to claim 13, wherein the receiving circuit includes a switching element connected in parallel with the impedance element and controlled in response to a control signal.

15. The data carrier according to claim 14, wherein the switching element is composed of a MOS transistor in which a source-drain path is connected in parallel with the impedance element, and a mute signal is supplied to a gate electrode.

16. The data carrier according to claim 14, wherein the switching element is controlled by the control signal to be continuously brought into an ON state during a command transmission period.

17. The data carrier according to claim 14, wherein the switching element is controlled by the control signal to be temporarily brought into an ON state during a period before receiving the response corresponding to the command.

18. The data carrier according to claim 14, wherein the receiving circuit further comprising:
- a detecting circuit configured to detect the reception signal received at the antenna;
- a low pass filter circuit connected to the detecting circuit to supply its output to the amplifying circuit; and
- a digitization circuit which is connected to the amplifying circuit and digitizes an output from the amplifying circuit to generate reception data.

* * * * *